United States Patent
Citterio

(10) Patent No.: US 7,165,868 B2
(45) Date of Patent: Jan. 23, 2007

(54) LUMINOUS DIFFUSER WITH DIFFERENTIATED LIGHT EMITTING PARTS FOR LIGHTING EQUIPMENT

(75) Inventor: Antonio Citterio, Milan (IT)

(73) Assignee: Flos S.p.A (IT)

( * ) Notice: Subject to any disclaimer, the term of this patent is extended or adjusted under 35 U.S.C. 154(b) by 221 days.

(21) Appl. No.: 10/518,804

(22) PCT Filed: Mar. 29, 2004

(86) PCT No.: PCT/IT2004/000157

§ 371 (c)(1),
(2), (4) Date: Dec. 17, 2004

(87) PCT Pub. No.: WO2004/090586

PCT Pub. Date: Oct. 21, 2004

(65) Prior Publication Data

US 2005/0226001 A1    Oct. 13, 2005

(30) Foreign Application Priority Data

Apr. 7, 2003 (IT) .................. BS20030037 U

(51) Int. Cl.
*F21V 11/00* (2006.01)

(52) U.S. Cl. .................. 362/355; 250/505.1

(58) Field of Classification Search ............... 362/355; 250/505.1

See application file for complete search history.

(56) References Cited

U.S. PATENT DOCUMENTS

| | | | | |
|---|---|---|---|---|
| 3,869,615 A * | 3/1975 | Hoover et al. | ............... | 378/146 |
| 4,460,832 A * | 7/1984 | Bigham | ................... | 250/505.1 |
| 4,465,540 A * | 8/1984 | Albert | ......................... | 156/252 |
| 4,651,012 A | 3/1987 | Clark et al. | | |
| 4,665,036 A * | 5/1987 | Dedden et al. | ........... | 435/288.7 |
| 5,954,423 A | 9/1999 | Logan et al. | | |

FOREIGN PATENT DOCUMENTS

DE    43 11 013    10/1993
GB        505250    5/1939

* cited by examiner

*Primary Examiner*—Ali Alavi
*Assistant Examiner*—Hargobind S. Sawhney
(74) *Attorney, Agent, or Firm*—McGlew & Tuttle, PC

(57) ABSTRACT

This invention concerns a light diffuser for lighting equipments which is made up of a front plate (14) with holes or openings (16) distributed uniformly over all its surface, and an internal sheet (15) associated with the internal surface of the front plate and having holes of a different diameter (17, 17', 17") along different parts of its length and each positioned in line with an opening in the front plate. The front plate and the internal sheet may be two associated bodies or form a single integrated body.

12 Claims, 3 Drawing Sheets

FIG.2
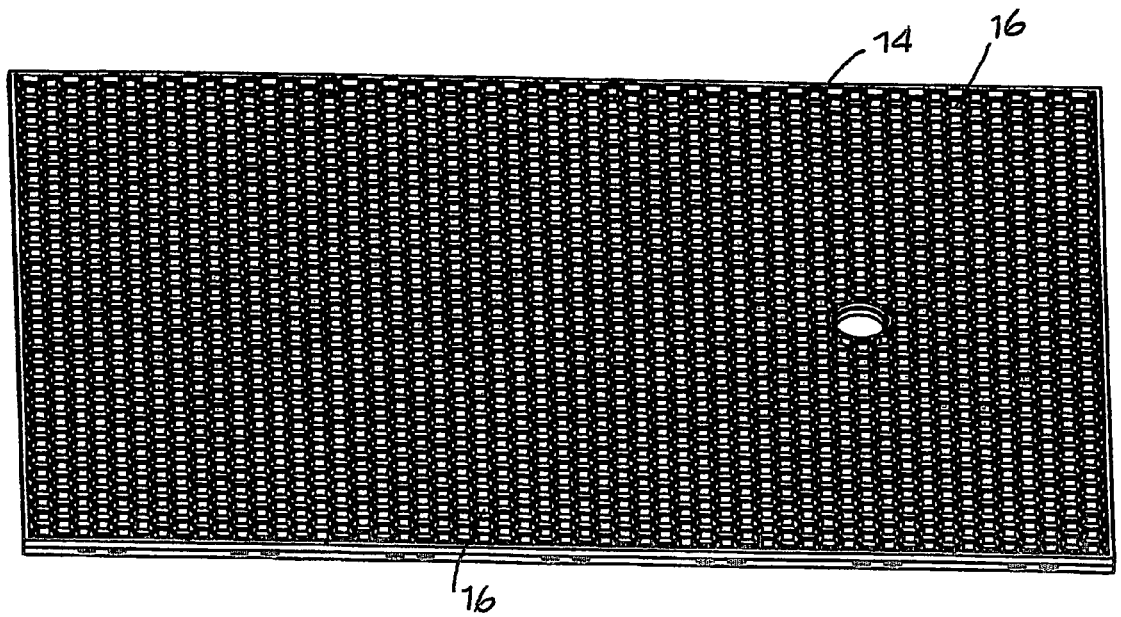
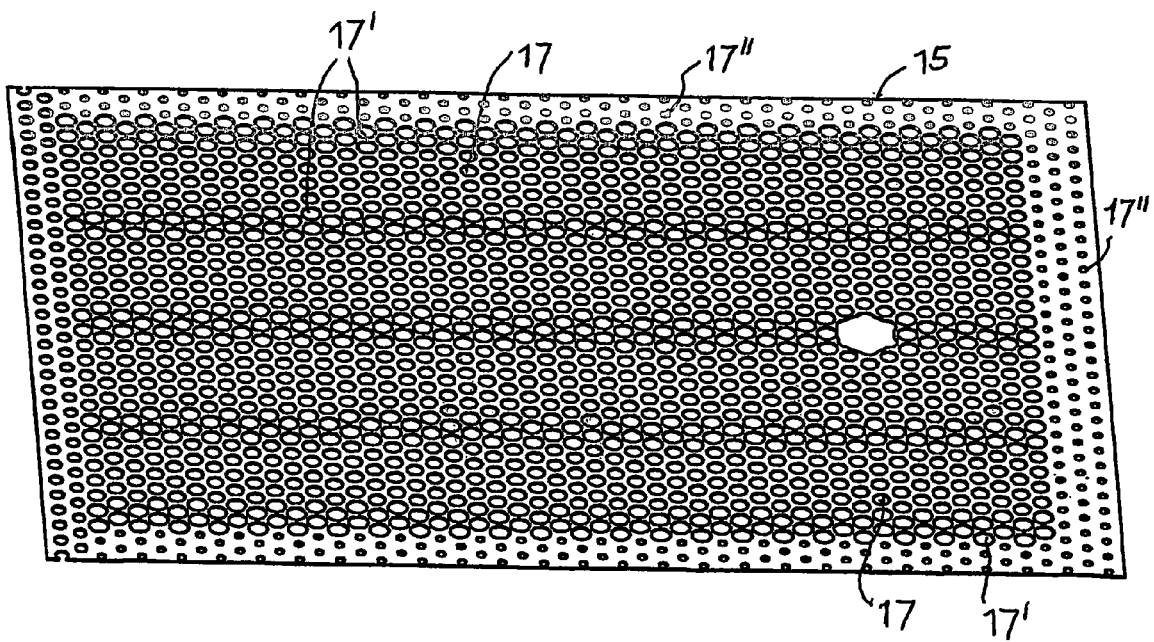
FIG.3

LUMINOUS DIFFUSER WITH DIFFERENTIATED LIGHT EMITTING PARTS FOR LIGHTING EQUIPMENT

FILED OF THE INVENTION

This invention concerns lighting equipment in general and refers in particular to a light diffuser for such equipment.

PRIOR ART

Lighting equipment, in particular if large, usually includes several light sources inside a housing and a light diffuser opposite those sources. Often, however, lighting equipment is more luminous in those parts in line with the internal light sources and less in the other parts further from the light sources.

OBJECTS OF THE INVENTION

One of the objects of this invention is to overcome this drawback so as to even out the emission of light in lighting equipment using a front diffuser.

Another object of the invention is to provide a light diffuser which enables a uniform light emission for all its wideness, even in the presence of local and distant light sources inside its body.

A further object of the invention is to provide a light diffuser configured to mask, in some of its parts, the wiring components, which would otherwise be visible from the outside of the body and be aesthetically unacceptable.

These objects and implicit advantages deriving from them are achieved by lighting equipment comprising several light sources, and wherein a light diffuser is formed by a front plate with holes positioned uniformly on all its surface and of an internal sheet associated with the internal surface of the front plate and having holes with different diameters in different parts of its length, positioned in line with the openings of the front plate itself.

BRIEF DESCRIPTION OF THE DRAWINGS

Further details of the invention will however become more evident from the description that follows made with reference to the attached drawings, which are indicative and not limiting, in which:

FIGS. 2 and 3 show, respectively, a view of only the front plate and a view of the internal sheet of the light diffuser.

DETAILED DESCRIPTION OF THE INVENTION

Figure 1:
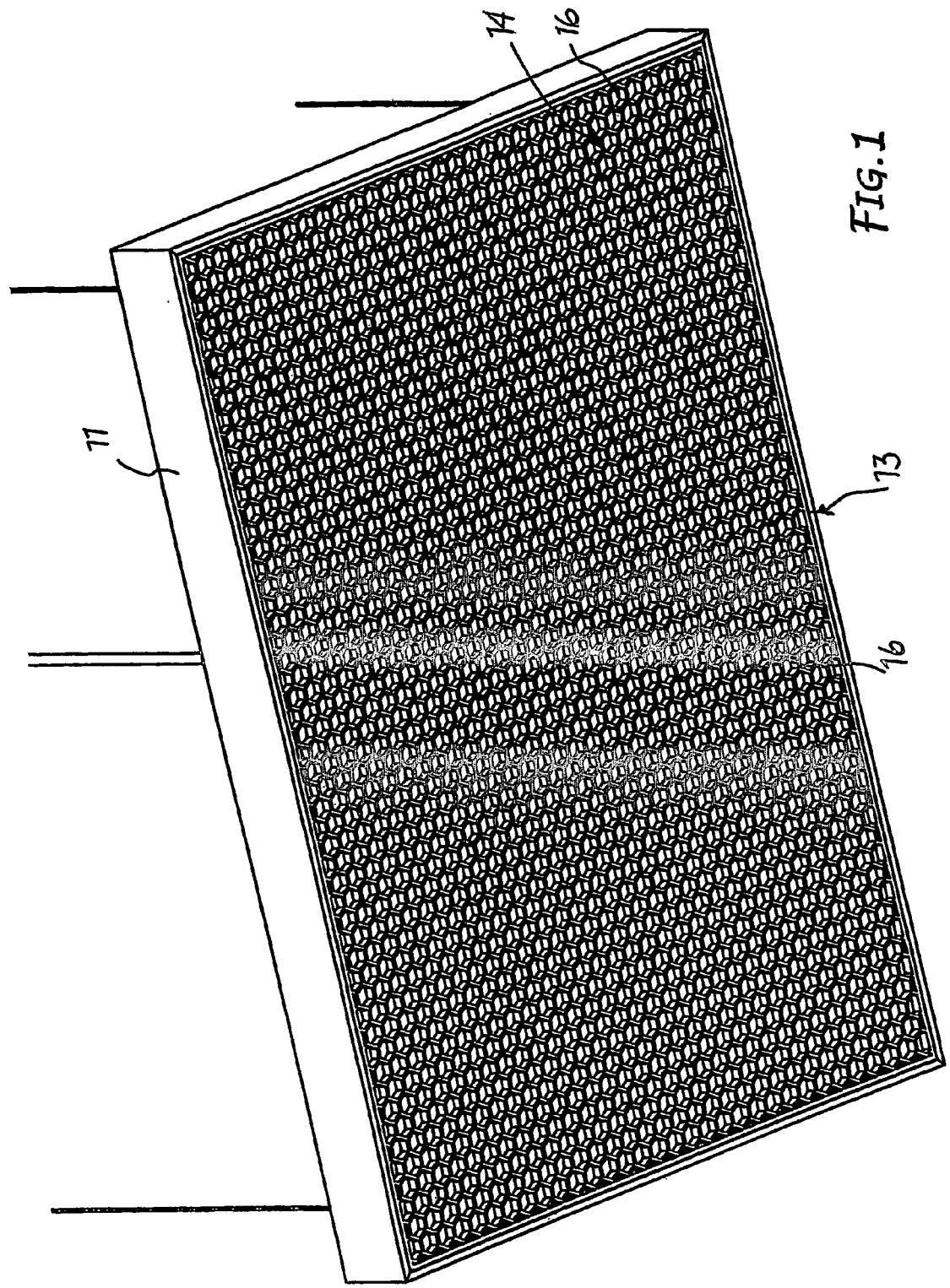
FIG. 1 shows an example of lighting equipment incorporating the light diffuser according to the invention.
Figure 4:
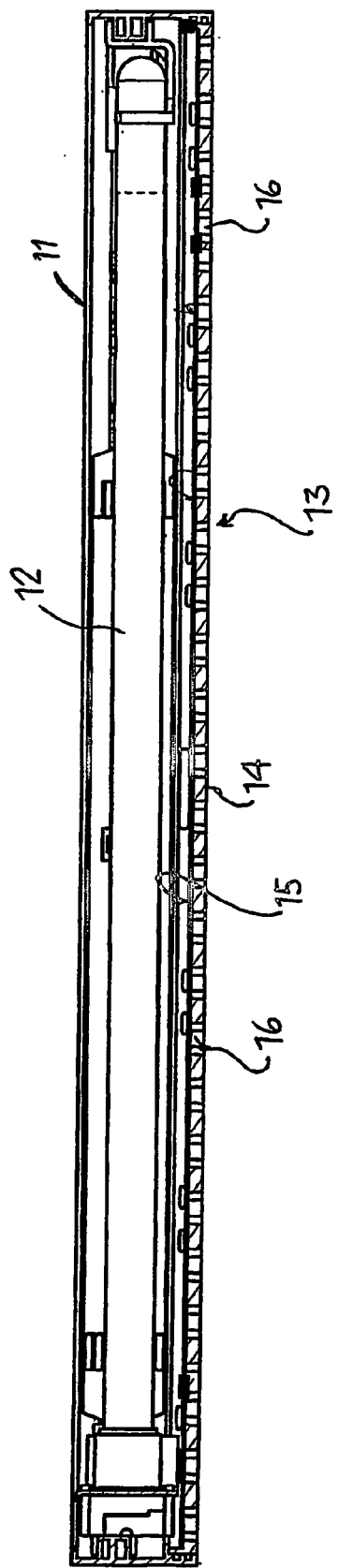
FIG. 4 shows a longitudinal section of the lighting equipment.

As shown, the lighting equipment includes a body or housing 11, which holds a number of light sources 12 suitably supported and wired and which is closed at the front by a light diffuser 13.

The light sources may be made up of any type of light and with sizes compatible with those of the lighting equipment.

The light diffuser 13 is composed of a front plate, that is external 14 and an internal sheet 13 directly associated with the front plate.

The front plate 14 is crossed by a multitude of holes or openings 16 all of the same width along all its length. The holes or openings 16 are uniformly distributed and are, for example, but not necessarily, honey-combed—FIGS. 1 and 2.

The internal sheet 15 may be made Up, as shown in the example in FIG. 3, of an element on its own, in the shape of a second sheet or a film, which can be applied to the internal surface of the front plate 14. But preferably the internal sheet can be obtained together with the front plate 14 in order to form in this case an integral part with said front plate.

Whatever the case, the internal sheet 15 has holes 17 of different diameters in various parts, as can be seen in FIG. 3. Each hole 17 of the internal sheet 15, whatever its size, is positioned in line with a hole or opening 16 in the front plate 14.

More precisely, the internal sheet has holes 17 of a set diameter in the parts in line with the light sources, holes 17' of a larger diameter in the parts distant from the light sources and between them, and smaller holes 17" along the edges of the diffuser.

The differences in holes 17 and 17' thus enable, even in the presence of equally sized holes or opening 16 in the front plate 14, to even out the light emission through the diffuser 13 even from the parts distant from the light sources, whereas the smaller holes 17" help to hide the internal supports and wiring of the light sources so that they are no longer visible through the front plate.

The invention claimed is:

1. Light diffuser for lighting equipments which comprising a body or housing enclosing a number of light sources suitably supported and wired and front a light diffuser, in a front part of said body or housing, characterized in that the light diffuser is made up of a front plate having holes or openings uniformly distributed over all its surface, and an internal sheet associated with an internal surface of the front plate and having holes of different diameters in different parts of its surface and each hole positioned in line with an opening in the front plate.

2. Light diffuser for lighting equipment according to claim 1, in which the front plated and the internal sheets are formed by two respective elements resting and fixed one against the other.

3. Light diffuser for lighting equipment according to claim 2, in which the front plate is perforated by a multitude of holes or openings all equal in size and over all its length, and in which the internal sheet has holes with a set diameter in the parts in line with the light sources, other holes of a larger size in the parts distant from the light sources and among these, other smaller holes along the edges of the diffuser.

4. Light diffuser for lighting equipment according to claim 1, in which the front plate and the internal sheet form a single integrated unit.

5. Light diffuser for lighting equipment according to claim 4, in which the front plate is perforated by a multitude of holes or openings all equal in size and over all its length, and in which the internal sheet has holes with a set diameter in the parts in line with the light sources, other holes of a larger size in the parts distant from the light sources and among these, other smaller holes along the edges of the diffuser.

6. Light diffuser for lighting equipment according to claim 1, in which the front plate is perforated by a multitude of holes or openings all equal in size and over all its length, and in which the internal sheet has holes with a set diameter in the parts in line with the light sources, other holes of a larger size in the parts distant from the light sources and among these, other smaller holes along the edges of the diffuser.

7. Lighting equipment comprising a body or housing enclosing several light sources suitably supported and wired and closed at the front by a light diffuser, characterized in that said diffuser is made up of a front plate with holes or openings uniformly positioned over all its surface, and of one internal sheet associated with the internal surface of the front plate and having holes with different diameters in different parts of its surface and each positioned in line with an opening in front plate.

8. Lighting equipment according to claim 7, in which the front plate and the internal sheet of the diffuser are made up of due respective elements resting and fixed one against the other.

9. Lighting equipment according to claim 8, in which the front plate of the diffuser is perforated for all its length, by a multitude of holes or openings all equal in size, and in which the internal sheet of the diffuser has holes of a set diameter in the parts in line with the light sources, other larger holes in the parts distant from the light sources and among these further smaller holes along the edges of the diffuser.

10. Lighting equipment according to claim 7, in which the front plate and the internal sheet of the diffuser form a single integral body.

11. Lighting equipment according to claim 10, in which the front plate of the diffuser is perforated for all its length, by a multitude of holes or openings all equal in size, and in which the internal sheet of the diffuser has holes of a set diameter in the parts in line with the light sources, other larger holes in the parts distant from the light sources and among these further smaller holes along the edges of the diffuser.

12. Lighting equipment according to claim 7, in which the front plate of the diffuser is perforated for all its length, by a multitude of holes or openings all equal in size, and in which the internal sheet of the diffuser has holes of a set diameter in the parts in line with the light sources, other larger holes in the parts distant from the light sources and among these further smaller holes along the edges of the diffuser.

* * * * *